United States Patent
Shamkovich et al.

[19]

[11] Patent Number: 6,055,167
[45] Date of Patent: Apr. 25, 2000

[54] PULSE WIDTH MODULATED BOOST CONVERTER INTEGRATED WITH POWER FACTOR CORRECTION CIRCUIT

[75] Inventors: Andrei Shamkovich, Stoney Brook; Donald Mulvey, Mastic; John J. Santini, Setauket, all of N.Y.

[73] Assignee: Custom Power Systems, Inc., Ronkonkoma, N.Y.

[21] Appl. No.: 09/132,103

[22] Filed: Aug. 10, 1998

[51] Int. Cl.[7] .................................................. H02H 7/125
[52] U.S. Cl. .............................. 363/52; 363/54; 363/85; 323/300
[58] Field of Search ................................. 363/34, 37, 39, 363/47, 50, 52, 53, 54, 85; 323/222, 299, 300

[56] References Cited

U.S. PATENT DOCUMENTS

| | | | |
|---|---|---|---|
| 3,152,296 | 10/1964 | Meszaros | 321/18 |
| 3,185,912 | 5/1965 | Smith et al. | 321/18 |
| 3,849,719 | 11/1974 | Geiersbach et al. | 363/85 X |
| 4,677,366 | 6/1987 | Wilkinson et al. | 323/222 |
| 4,683,529 | 7/1987 | Bucher, II | 363/44 |
| 4,688,162 | 8/1987 | Mutch et al. | 363/80 |
| 4,761,725 | 8/1988 | Henze | 363/46 |
| 4,825,351 | 4/1989 | Uesugi | 363/79 |
| 4,827,151 | 5/1989 | Okado | 307/66 |
| 4,876,497 | 10/1989 | Colver | 323/211 |
| 4,940,929 | 7/1990 | Williams | 323/222 |
| 4,942,509 | 7/1990 | Shires et al. | 363/89 |
| 4,982,148 | 1/1991 | Engelmann | 323/207 |
| 5,001,620 | 3/1991 | Smith | 363/89 |
| 5,003,454 | 3/1991 | Bruning | 363/81 |
| 5,006,975 | 4/1991 | Neufeld | 363/80 |
| 5,047,912 | 9/1991 | Pelly | 363/89 |
| 5,134,355 | 7/1992 | Hastings | 323/211 |
| 5,146,398 | 9/1992 | Vila-Masot et al. | 363/89 |
| 5,233,509 | 8/1993 | Ghotbi | 363/89 |
| 5,349,284 | 9/1994 | Whittle | 323/207 |
| 5,383,109 | 1/1995 | Maksimovic et al. | 323/222 |
| 5,408,403 | 4/1995 | Nerone et al. | 363/37 |
| 5,430,364 | 7/1995 | Gibson | 323/207 |
| 5,459,392 | 10/1995 | Mandelcorn | 323/222 |
| 5,465,011 | 11/1995 | Miller et al. | 363/34 X |
| 5,502,630 | 3/1996 | Rokhvarg | 363/84 |
| 5,515,261 | 5/1996 | Bogdan | 363/89 |
| 5,519,306 | 5/1996 | Itoh et al. | 323/222 |
| 5,532,528 | 7/1996 | Lammers | 307/125 |
| 5,532,918 | 7/1996 | Mayrand | 363/89 |
| 5,565,761 | 10/1996 | Hwang | 323/222 |
| 5,572,416 | 11/1996 | Jacobs | 363/89 |

*Primary Examiner*—Jessica Han
*Attorney, Agent, or Firm*—Brown, Pinnisi & Michaels, P.C.

[57] ABSTRACT

An integrated power factor converter utilizes a silicon controlled rectifier (SCR) bridge which limits the inrush current by controlling the conduction angle of the SCR's. The same SCR bridge shuts down the output in case of short circuit and recovers automatically at a predetermined duty cycle rate. In case the input voltage exceeds approximately 275 VAC, the SCR bridge regulates the output voltage to below 400 VDC. The input inrush current is reduced by phasing up the input voltage in a controlled manner. The use of SCR's in the input bridge produces no additional losses, since the rectifier function is required regardless of which topology is used. The integrated power factor converter interfaces universal voltage mains to DC/DC converters while reducing input harmonics.

15 Claims, 4 Drawing Sheets

PULSE WIDTH MODULATED BOOST CONVERTER INTEGRATED WITH POWER FACTOR CORRECTION CIRCUIT

The invention pertains to the field of high power factor converters. More particularly, the invention pertains to an integrated front end unit of a high power factor converter.

BACKGROUND OF THE INVENTION

The power factor (pf) is defined as the ratio of the actual power to the apparent power. Phrased differently, the power factor is the ratio of watts average power to the apparent power in an AC circuit, typically expressed as $$pf = \frac{\text{watts average power}}{\text{rms volts} \times \text{rms amperes}}$$

The power factor is the cosine of the phase angle between the voltage and current, ranging from 0 (purely reactive circuit) to 1 (purely resistive circuit). A power factor of less than 1 therefore indicates some component of reactive current. The greater the power factor, the greater the useful power being delivered to the load. Circuits that use only a little power are not adversely affected by a poor power factor. However, as individual circuits are combined into hundreds or thousands of circuits, poor power factor becomes a problem. Poor power factor is also a problem with circuits involving significant power output. Power utilities charge industrial users according to the power factor, which explains the capacitor yards one sees behind large factories, built to cancel the inductive reactance of motors found in machinery.

Although power generation plants generate AC power, DC power is very useful for certain applications, including many motors. An AC-DC converter takes AC power, such as found in most households, and converts it into DC power. Power factor is enhanced in high power factor converters by forcing the input current waveform to follow the input voltage waveform, which is usually sinusoidal. This technique minimizes current distortion and increases the power capacity of the standard AC outlet, since the outlets are protected by current actuated circuit breakers.

Most electronic loads and switching power supplies use a full wave bridge rectifier and capacitive input filter. Such a circuit draws power from the input line when the instantaneous AC voltage exceeds the capacitor voltage. The resulting current is distorted and has a high harmonic content. As a result, the power factor is low, typically in the range 0.5–0.6, with the input apparent power much higher than actual power. Power factor correction (PFC) circuits allow better utilization of the AC line by increasing the power factor to 0.98–0.99. In addition, the high power factor leads to the reduction of the input current harmonics. This is important in view of the latest IEC 1000-3-2 (replacing IEC 555-2) regulation, adopted as a European standard (EN 61000-3-2) mandatory for all equipment manufactured after 2000, which allows a third harmonic level of no more than 3.4 mA/watt with an absolute limit of 2.3 amps rms max for power levels above 75 W. Thus, a 100 W unit is limited to third harmonic current of 340 mA.

European power authorities are concerned about voltage distortion caused by non-linear loads. At present levels of growth of non-linear loads, they estimate that by 2001 such voltage distortion will exceed 5%. Harmonic voltage distortion is more of a European problem rather than a North American problem due to the differences in design of the respective distribution systems. Delta-wye distribution transformers tend to dissipate the triplen harmonics, thus preventing them from causing voltage distortion on the primary side of the transformers. Since the European distribution system uses a few large distribution transformers with very large loads, large motors can be on the same circuit as electronic loads and thus be subject to the harmonic voltage distortion caused by the electronic loads. In the North American distribution system, a large number of small distribution transformers are used with relatively small loads. Large motors are driven from higher voltages than electronic loads, so they are isolated from the sources of voltage distortion. Nevertheless, the triplen harmonics dissipate in delta-wye distribution transformers as unwanted heat.

PFC circuits fall into two groups: passive and active. Passive circuits are used primarily in low power applications since reactive components (chokes and capacitors) tend to be quite large. On the other hand, active circuits, such as switched-mode PFC circuits, run at high frequencies and process a lot of power at very high efficiency. The topology most commonly used is known as non-isolated boost. This topology usually utilizes a dedicated controller which performs all conversion, monitoring, and protection functions. Existing PFC circuit designs produce an output DC voltage which is higher than the peak of the input sine wave at high line.

The drawback of this approach is that when the input line produces an overvoltage spike, the boost shuts down and output is charged to the peak of the input waveform. This situation can be damaging to following stage DC—DC converters. The overload or short circuit conditions in current designs cannot be controlled, with the input fuse usually clearing, which can be objectionable in some critical applications. Upon initial application of AC power, the inrush current can be very high, creating disturbance of the input sine wave and causing the protection fuse to blow.

Commonly used passive protection devices such as thermisters provide only limited protection against inrush current, while providing no protection against short circuit and overvoltage conditions. Conventional buck-boost converters use power FET's (field effect transistors) to switch at high frequencies in order to regulate the output voltage. These devices are relatively expensive and fragile compared to SCR's (silicon controlled rectifiers).

In addition, the series switch of the conventional buck-boost converter is an extra power switch which produces still more objectionable losses. The fast switching frequency produces still more losses.

SUMMARY OF THE INVENTION

Briefly stated, an integrated power factor converter utilizes a silicon controlled rectifier (SCR) bridge which limits the inrush current by controlling the conduction angle of the SCR's. The same SCR bridge shuts down the output in case of short circuit and recovers automatically at a predetermined duty cycle rate. In case the input voltage exceeds approximately 275 VAC, the SCR bridge regulates the output voltage to below 400 VDC. The input inrush current is reduced by phasing up the input voltage in a controlled manner. The use of SCR's in the input bridge produces no additional losses, since the rectifier function is required regardless of which topology is used. The present invention allows a user to interface universal voltage mains to DC/DC converters. Input harmonics comply with EN 61000-3-2 (update of EN 60555-2). With an integral EMI filter, the present invention enables a user to meet a stringent EMI specification (EN 55022/B) and handle an input surge level of up to 4,000 V (EN 61000-4-5).

According to an embodiment of the invention, a pulse width modulated boost converter which provides power factor correction between an input sinusoidal AC voltage source and a load includes means for filtering said input sinusoidal AC voltage and producing a filtered output; rectifying means for rectifying said filtered output to produce a rectified output; and controlling means, controlling said rectifying means, and connected to said filtered output, for sensing both a zero crossover point and a maximum amplitude of said input sinusoidal AC voltage, wherein a phase of said rectified output is controlled.

DESCRIPTION OF THE PREFERRED EMBODIMENT

Figure 1:
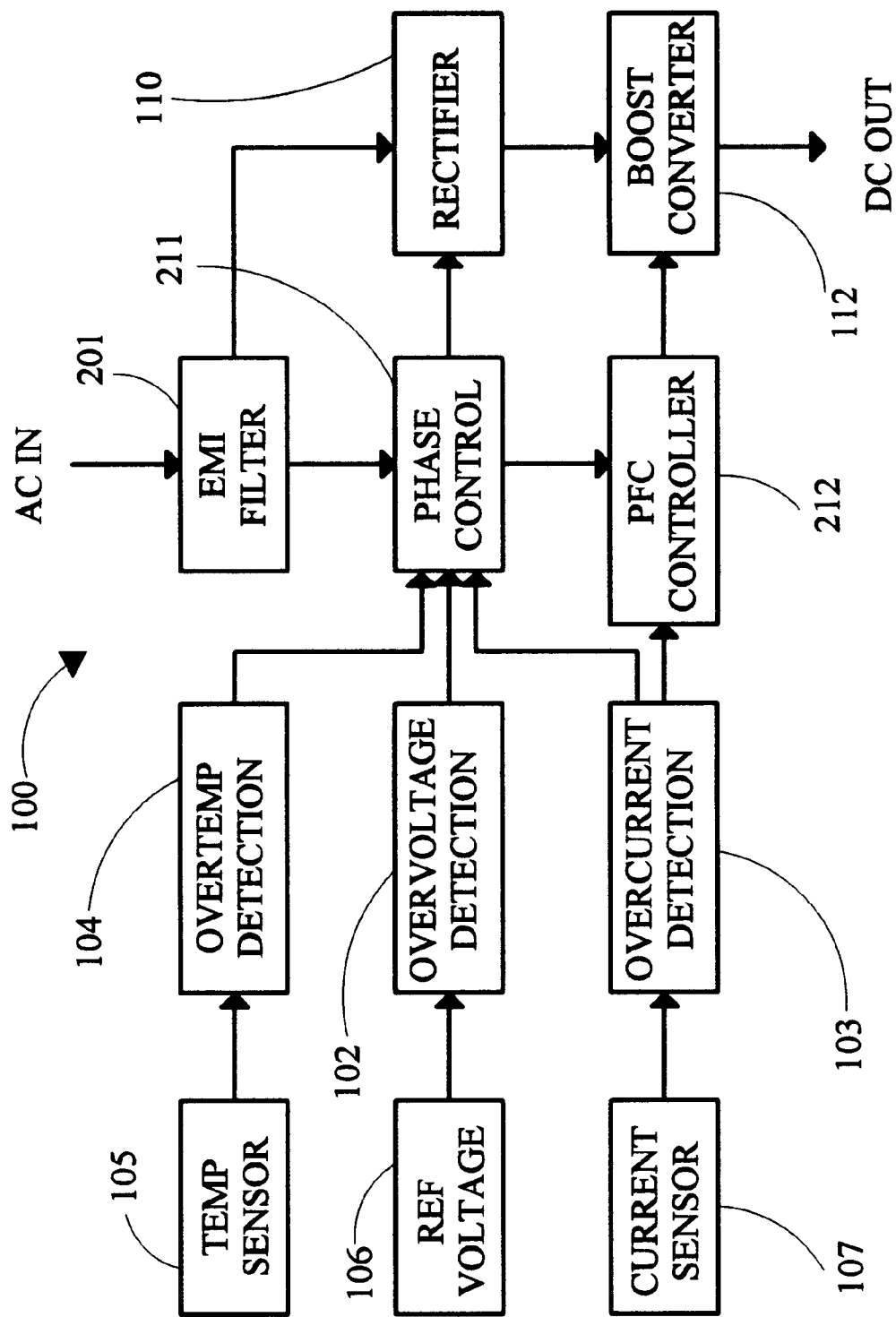
FIG. 1 shows a block diagram of a phase control and boost converter according to an embodiment of the present invention.

Referring to FIG. 1, an integrated front end unit 100 is shown. Integrated front end unit 100 includes a rectifier 110, which in conjunction with a boost converter 112 and a PFC controller 212, rectifies an input AC voltage AC IN that has been smoothed by an EMI filter 201 to produce a DC output DC OUT. A phase control 211 receives information from the AC IN lines. The SCR's in the rectifier 110 are controlled by the output of phase control 211.

An overcurrent detection unit 103 monitors the input current by receiving information from a current sensor 107 and sending an output to a phase control 211. In an event of an overload or short circuit it shuts down the SCR's immediately and then recovers. On recovery the phase angle is controlled from zero upwards, creating "slow start" mode. In case of prolonged overload or short circuit on the output, the unit cycles continuously at low duty cycle (approximately 1%). PFC controller 212 is disabled in case of overcurrent. Each shutdown cycle has a low duty cycle, keeping the average power dissipation in the semiconductors under control. An input protection fuse (not shown) is not blown under a prolonged short circuit condition.

Phase control 211 senses the peak of the input sine wave and creates a feed-forward control algorithm which cuts down a phase angle of the SCR's, thereby maintaining the output voltage in semi-regulated state. An inrush current control ramp in phase control 211 programs the phase angle of input AC waveform, limiting the inrush current.

An overvoltage detection unit 102 compares a portion of the input voltage from AC IN to an output of a reference voltage unit 106. The SCR control angle of the SCR's is adjusted to keep the output voltage amplitude constant.

An overtemperature detection unit 104 receives its input from a temperature sensor 105, such as a thermistor, and compares this input to an internal reference. The SCR's are shut off in the event of excessive temperature.

The input voltage control is accomplished using the following relationship:

$$V_{OUT} = V_{IN} \sqrt{2} \sin(180° - x),$$

where $V_{OUT}$ is the regulated output voltage in volts, $V_{IN}$ is the input RMS voltage in volts, and x is the control angle in degrees.

The input RMS power is defined by:

$$P_{rms} = V_{IN} \sqrt{\frac{1}{T} \int_0^T I \sin(180° - x)^2 \, dx}$$

where I is the instantaneous current in amps and T is the period of the line frequency in degrees.

The power factor PF drops during a voltage control mode, and is defined by:

$$PF = \frac{PF_{displ}}{\sqrt{1 + \left(\frac{I_{rmsdist}}{I_{rmsfirst}}\right)^2}}$$

where $PF_{displ}$ is the displacement power factor due to the reactive nature of the converter (usually close to unity), $I_{rms\ dist}$ is the RMS distortion component of the input current in amps, and $I_{rms\ first}$ is the RMS fundamental component in amps.

Figure 2:
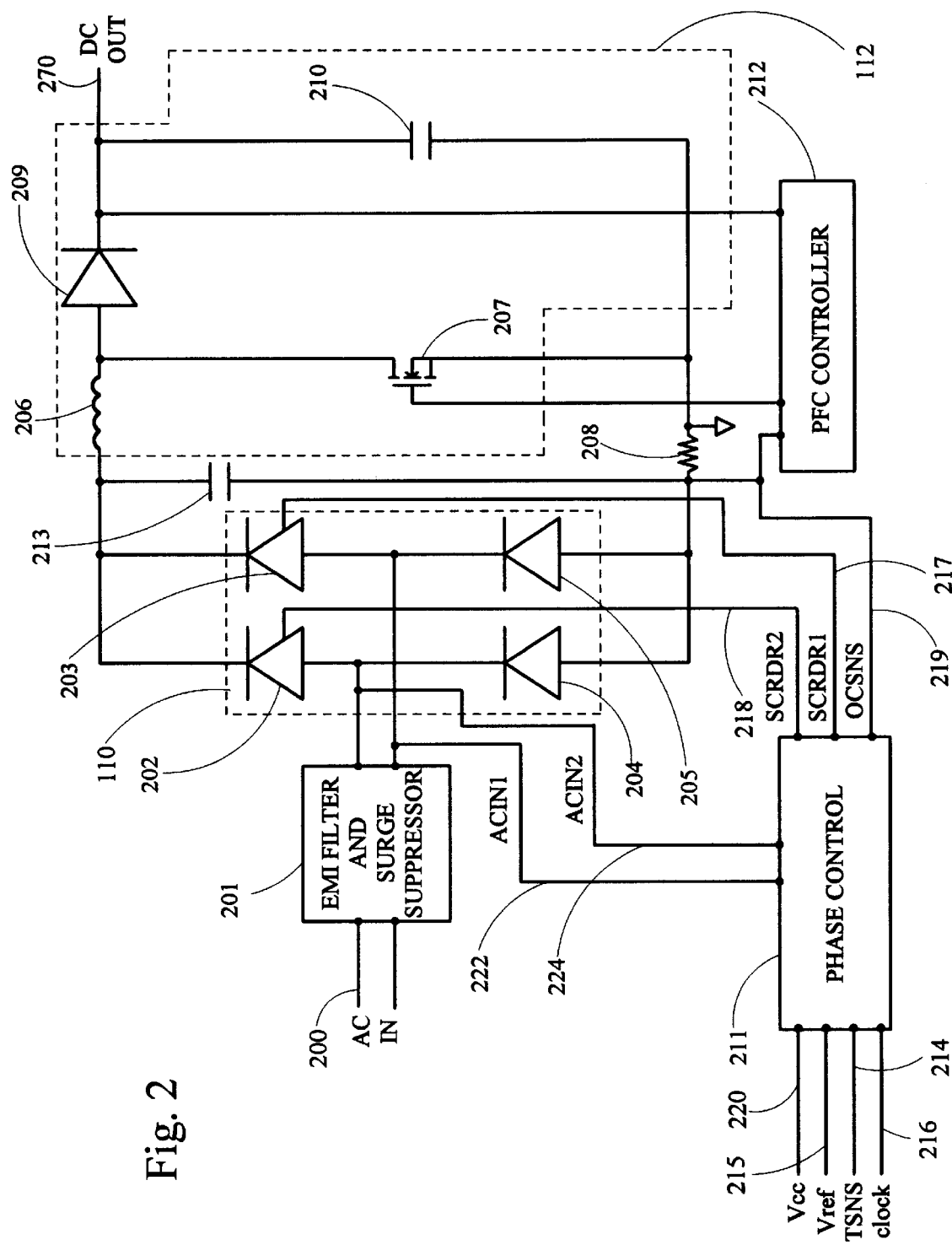
FIG. 2 shows a schematic illustrating the essential elements of a boost converter with the phase control of the present invention.

Referring to FIG. 2, a boost converter 112 is shown along with phase control circuit 211 and rectifier 110. An input sinusoidal AC voltage source 200 is input to an EMI filter and surge suppressor 201, which attenuates HF noise to allow the circuit to meet EMI specifications. An output of EMI filter and surge suppressor 201 is fed to input bridge rectifier 110 consisting of two power rectifiers 204 and 205 and two SCR's 202 and 203. SCR's 202, 203 are gated by a phase control circuit 211, which is a timing circuit sensing both the input AC voltage zero crossover point and maximum amplitude. By controlling the firing angle of the SCR's with respect to zero crossover point, the output voltage 270 (DC OUT) is controlled. An input EMI capacitor 213 is in parallel with input bridge rectifier 110. An output of bridge rectifier 110 is connected to a main power inductor 206, which is continuously modulated in boost mode by a high frequency pulse train.

Boost converter 112 includes a main power switch 207 controlled by a PFC controller 212 such as the L4981 manufactured by SGS-Thomson. Main power switch 207 is connected to an output of main power inductor 206. The output of main power inductor 206 is fed to a load (not shown) on the DC OUT output through an output rectifier 209. An output storage capacitor 210 filters and stores the DC output voltage.

A current sense resistor 208 creates an error voltage drop OCSNS 219 in the event of an output overload or short circuit. The error voltage OCSNS 219 is compared in phase control 211 with an internal reference Vref from line 215.

Figure 3:
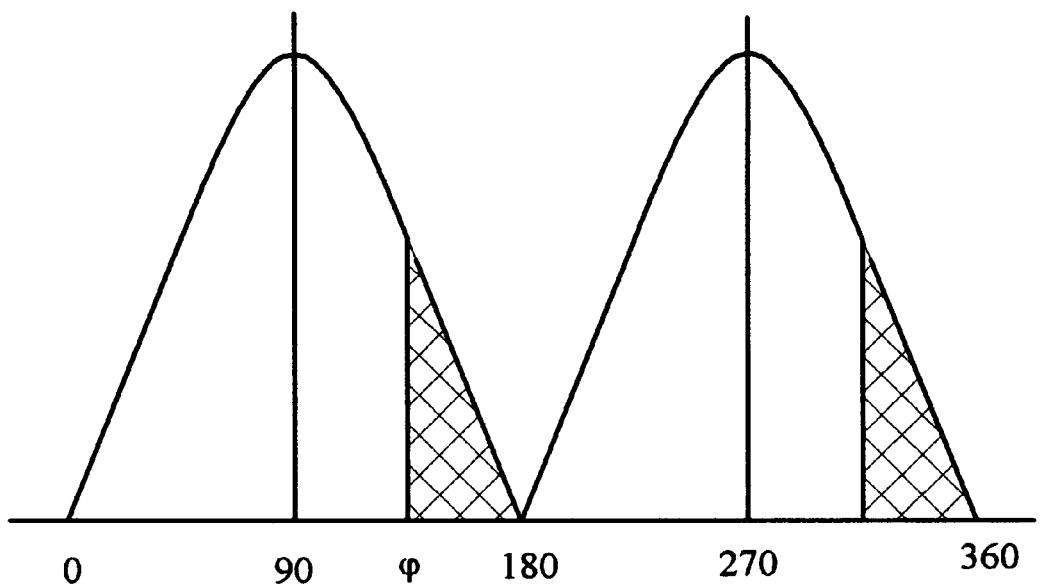
FIG. 3 shows a load voltage waveform for the phase control of the present invention.

Referring to FIG. 3, a load voltage waveform of DC OUT 270 (FIG. 2) is shown for the phase control of the present invention. As the phase is increased by phase control 211, the output voltage increases. As the phase is decreased by phase control 211, the output voltage decreases.

Figure 4:
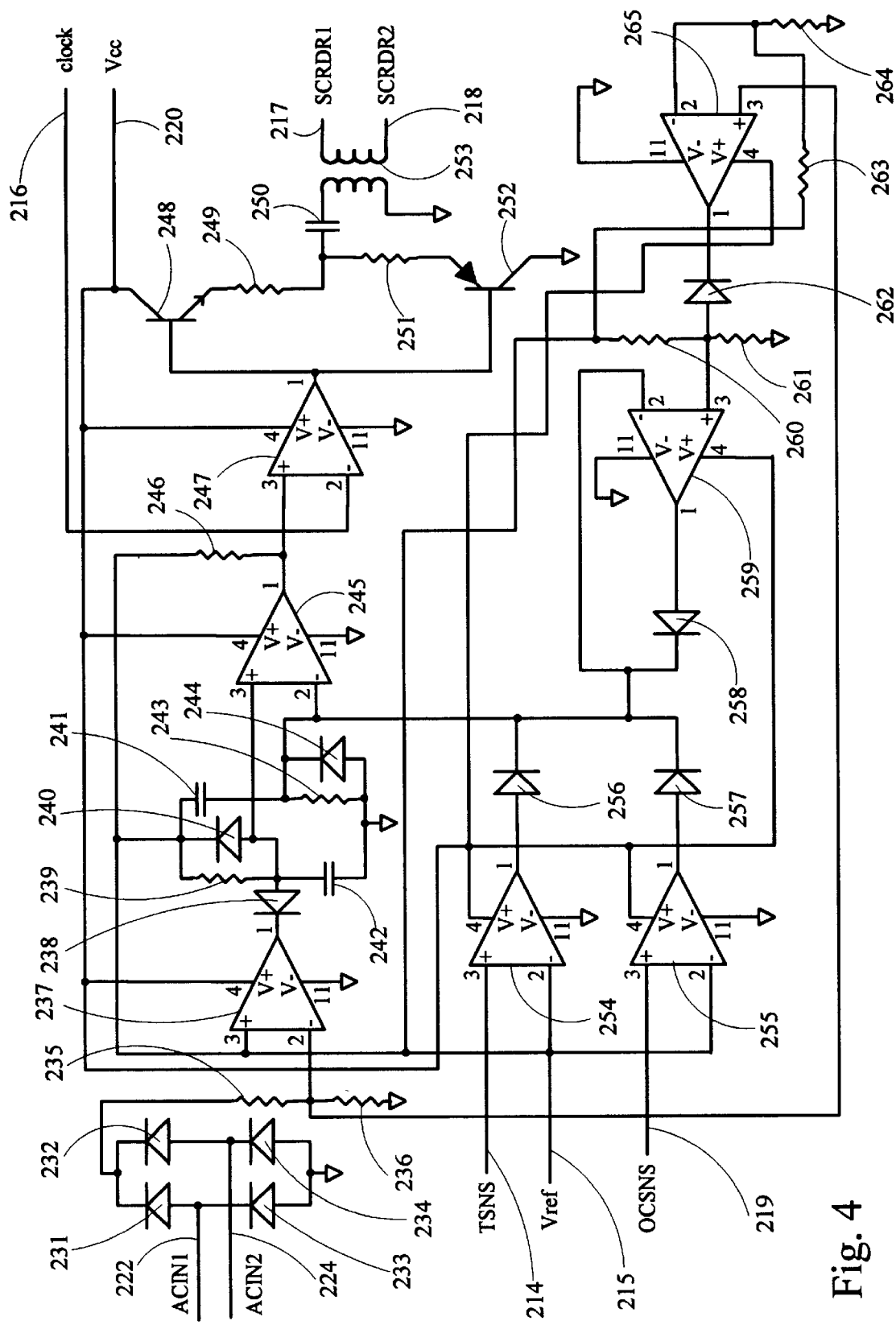
FIG. 4 shows a schematic of the circuit for the phase control of the present invention.

Referring to FIG. 4, the phase control circuit for phase control 211 is shown. Four diodes 231, 232, 233, and 234 rectify the input AC voltage after it has passed through EMI filter and surge suppressor 201 (FIG. 2). This voltage is then divided down by resistors 235, 236. A comparator 237 acts as a zero crossover detector which produces a square pulse each time a sine wave crosses a threshold of approximately 20 V. The square pulses are then converted to a sawtooth signal at the noninverting input of a comparator 245. An RC network consisting of a resistor 243 and a capacitor 241 is a slow start and control circuit. The voltage at the inverting input of comparator 245 is compared with the sawtooth signal at the noninverting input of comparator 245, so that the duration of the resulting output signal determines the phase of the SCR control (FIG. 2). In other words, comparator 245 acts like a pulse width modulator.

A comparator 247 is a high frequency modulator. The inverting terminal input to comparator 247 is modulated by a 100 KHz square wave signal coming in on clock line 216. This signal in turn is modulated by the signal at the noninverting terminal to comparator 247. The output of comparator 247 is applied to the complementary driver 248, 252 which transmits the modulated square wave pulse train to the gates of SCR's 202, 203 (FIG. 2) via a transformer 253 and SCR driver output lines 217, 218.

A comparator 254 is a temperature monitor. A thermistor (not shown), which senses the temperature rise of the main switching devices (not shown), outputs on a TSNS line 214. This output is compared with an internal reference, Vref, from line 215. In the case of overtemperature, comparator 254 flips positive and forces the inverting input to comparator 245 HIGH, turning the SCR's 202, 203 (FIG. 2) off.

A comparator 255 acts as an overcurrent control. In case of an output overload or short circuit, the error voltage across a current sense resistor 208 (FIG. 2) is fed to the noninverting input of comparator 255 and compared with the internal reference Vref from line 215. If the current amplitude exceeds a predetermined level, the output of comparator 255 flips HIGH, disabling the SCR's 202, 203 (FIG. 2).

A comparator 265 and an operational amplifier 259 comprise an overvoltage control circuit. An output of comparator 265 flips HIGH when the input voltage after being divided by resistors 235, 236 exceeds 285 vrms. This in turn releases a divider consisting of resistors 260, 261. This divider controls an output of operational amplifier 259 which acts as a precision rectifier. This rectifier controls the voltage at comparator 245 so that the SCR control angle (FIG. 3) is adjusted and output voltage amplitude is kept constant.

Accordingly, it is to be understood that the embodiments of the invention herein described are merely illustrative of the application of the principles of the invention. Reference herein to details of the illustrated embodiments are not intended to limit the scope of the claims, which themselves recite those features regarded as essential to the invention.

What is claimed is:

1. A pulse width modulated boost converter which provides power factor correction between an input sinusoidal AC voltage source and a load, comprising:
   a) means for filtering said input sinusoidal AC voltage and producing a filtered output;
   b) rectifying means for rectifying said filtered output to produce a rectified output; and
   c) controlling means, controlling said rectifying means, and connected to said filtered output, for sensing both a zero crossover point and a maximum amplitude of said input sinusoidal AC voltage, wherein a phase of said rectified output is controlled.

2. A boost converter according to claim 1, further comprising:
   d) means for controlling a phase angle of said rectified output from zero upwards.

3. A boost converter according to claim 2, wherein said means for controlling a phase angle of said rectified output from zero upwards includes an RC network consisting of a first resistor and a first capacitor in series.

4. A boost converter according to claim 2, wherein said rectifying means is an input bridge rectifier including:
   a) a first bridge span including a first SCR in series with a first power rectifier;
   b) a second bridge span including a second SCR in series with a second power rectifier; and
   c) said first bridge span and said second bridge span are in parallel.

5. A boost converter according to claim 1, further comprising:
   d) overtemperature detecting and shutoff means for detecting an overtemperature of said boost converter and turning said boost converter off when said overtemperature is detected.

6. A boost converter according to claim 5, wherein said rectifying means is an input bridge rectifier including:
   a) a first bridge span including a first SCR in series with a first power rectifier;
   b) a second bridge span including a second SCR in series with a second power rectifier; and
   c) said first bridge span and said second bridge span are in parallel.

7. A boost converter according to claim 1, further comprising:
   d) current sensing and shutoff means for sensing an overcurrent condition and for turning said boost converter off when said overcurrent condition is detected.

8. A boost converter according to claim 7, wherein said rectifying means is an input bridge rectifier including:
   a) a first bridge span including a first SCR in series with a first power rectifier;
   b) a second bridge span including a second SCR in series with a second power rectifier; and
   c) said first bridge span and said second bridge span are in parallel.

9. A boost converter according to claim 1, further comprising:
   d) overvoltage sensing means for sensing an overvoltage condition; and
   e) means, responsive to said overvoltage sensing means, for keeping an output DC voltage going to said load constant.

10. A boost converter according to claim 9, wherein said rectifying means is an input bridge rectifier including:
    a) a first bridge span including a first SCR in series with a first power rectifier;
    b) a second bridge span including a second SCR in series with a second power rectifier; and
    c) said first bridge span and said second bridge span are in parallel.

11. A boost converter according to claim 9, further comprising:
    f) current sensing and shutoff means for sensing an overcurrent condition and for turning said boost converter off when said overcurrent condition is detected.

12. A boost converter according to claim 11, further comprising:
    g) overtemperature detecting and shutoff means for detecting an overtemperature of said boost converter and turning said boost converter off when said overtemperature is detected.

13. A boost converter according to claim 12, further comprising means for controlling a phase angle of said rectified output from zero upwards.

14. A boost converter according to claim 13, wherein said rectifying means is an input bridge rectifier including:
   a) a first bridge span including a first SCR in series with a first power rectifier;
   b) a second bridge span including a second SCR in series with a second power rectifier; and
   c) said first bridge span and said second bridge span are in parallel.

15. A boost converter according to claim 1, wherein said rectifying means is an input bridge rectifier including:
   a) a first bridge span including a first SCR in series with a first power rectifier;
   b) a second bridge span including a second SCR in series with a second power rectifier; and
   c) said first bridge span and said second bridge span are in parallel.

* * * * *